(12) United States Patent
Ford et al.

(10) Patent No.: US 11,113,822 B2
(45) Date of Patent: Sep. 7, 2021

(54) MOVING OBJECT IDENTIFICATION FROM A VIDEO STREAM

(71) Applicant: International Business Machines Corporation, Armonk, NY (US)

(72) Inventors: Egan Francis Ford, Draper, UT (US); Jonathan Dye, Lindon, UT (US); Dmitry Rekesh, Pleasanton, CA (US); Galina Grunin, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 84 days.

(21) Appl. No.: 16/540,268

(22) Filed: Aug. 14, 2019

(65) Prior Publication Data

US 2021/0049770 A1    Feb. 18, 2021

(51) Int. Cl.
*G06K 9/00* (2006.01)
*G06T 7/20* (2017.01)
*G06K 9/62* (2006.01)
*G06K 9/42* (2006.01)

(52) U.S. Cl.
CPC ............ *G06T 7/20* (2013.01); *G06K 9/00718* (2013.01); *G06K 9/00744* (2013.01); *G06K 9/42* (2013.01); *G06K 9/6228* (2013.01); *G06T 2207/10016* (2013.01); *G06T 2207/20084* (2013.01)

(58) Field of Classification Search
CPC .. G06T 7/20; G06K 9/00718; G06K 9/00744; G06K 9/42; G06K 9/6228
USPC ........................................................ 382/103
See application file for complete search history.

(56) References Cited

U.S. PATENT DOCUMENTS

| 7,764,808 | B2 | 7/2010 | Zhu et al. |
| 8,134,596 | B2 | 3/2012 | Lei et al. |
| 8,150,103 | B2 | 4/2012 | Zhang et al. |
| 8,238,605 | B2 | 8/2012 | Chien et al. |
| 8,571,261 | B2 | 10/2013 | Gagvani et al. |
| 9,158,971 | B2 | 10/2015 | Gaidon et al. |
| 9,390,333 | B2 | 7/2016 | Varghese |

(Continued)

FOREIGN PATENT DOCUMENTS

| CN | 104244113 A | 12/2014 |
| EP | 2224738 A1 | 9/2010 |
| WO | 2008063058 A1 | 5/2008 |

OTHER PUBLICATIONS

Google Patents English translation of CN104244113A, printed Jul. 31, 2019.

(Continued)

*Primary Examiner* — Stephen P Coleman
(74) *Attorney, Agent, or Firm* — Sonny Z. Zhan

(57) ABSTRACT

A video stream moving object identifier takes a series of video frames as input, reduces the scale of the video frames, then performs pixel analysis on the sequential video frames to identify moving objects. Once moving objects are identified, the moving objects are resized according to input rules for a neural network object classifier to make the resized objects the correct size to be input to the neural network object classifier. The moving objects are then sent to a neural network object classifier, which processes the objects and returns an identification of the moving objects. The neural network object classifier can operate using one or more whitelists and one or more blacklists.

17 Claims, 6 Drawing Sheets

(56) References Cited

U.S. PATENT DOCUMENTS

| | | |
|---|---|---|
| 9,454,819 B1 | 9/2016 | Seetharaman et al. |
| 2011/0134242 A1* | 6/2011 | Loubser ............. G06K 9/00771 |
| | | 348/143 |
| 2017/0255832 A1 | 9/2017 | Jones et al. |
| 2018/0039853 A1* | 2/2018 | Liu ......................... G06K 9/72 |
| 2018/0046877 A1 | 2/2018 | Chen et al. |
| 2018/0150681 A1* | 5/2018 | Wang ................... G06K 9/4628 |
| 2019/0205620 A1* | 7/2019 | Yi ........................ G06K 9/6262 |

OTHER PUBLICATIONS

Leng et al., "Video Object Segmentation Based on Accumulative Frame Difference", printed from https://pdfs.semanticscholar.org/f82c/bfc85a90d46bda72142dd78e1516823d8c39.pdf on Aug. 29, 2018.

* cited by examiner

MOVING OBJECT IDENTIFICATION FROM A VIDEO STREAM

BACKGROUND

1. Technical Field

This disclosure generally relates to video systems, and more specifically relates to identifying moving objects in a video stream from a stationary camera.

2. Background Art

Video cameras are becoming commonplace in many different settings. Manually monitoring video streams from a large number of stationary video cameras using human monitors is not efficient. Instead, computer-based systems are needed that can monitor video streams in near real-time, and automatically identify items of interest in a video stream.

One specific type of item of interest in a video stream is moving objects. Known methods of processing a video stream to identify and classify moving objects take considerable computer resources and time and can be inaccurate. For example, some systems cannot reliably eliminate birds or foliage that moves when the wind blows. As a result, considerable time and resources are spent analyzing images for moving objects when many of the moving objects are not of interest.

BRIEF SUMMARY

A video stream moving object identifier takes a series of video frames as input, reduces the scale of the video frames, then performs pixel analysis on the sequential video frames to identify moving objects. Once moving objects are identified, the moving objects are resized according to input rules for a neural network object classifier to make the resized objects the correct size to be input to the neural network object classifier. The moving objects are then sent to a neural network object classifier, which processes the objects and returns an identification of the moving objects. The neural network object classifier can operate using one or more whitelists and one or more blacklists.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

A video stream moving object identifier takes a series of video frames as input, reduces the scale of the video frames, then performs pixel analysis on the sequential video frames to identify moving objects. Once moving objects are identified, the moving objects are resized according to input rules for a neural network object classifier to make the resized objects the correct size to be input to the neural network object classifier. The moving objects are then sent to a neural network object classifier, which processes the objects and returns an identification of the moving objects. The neural network object classifier can operate using one or more whitelists and one or more blacklists.

Figure 1:
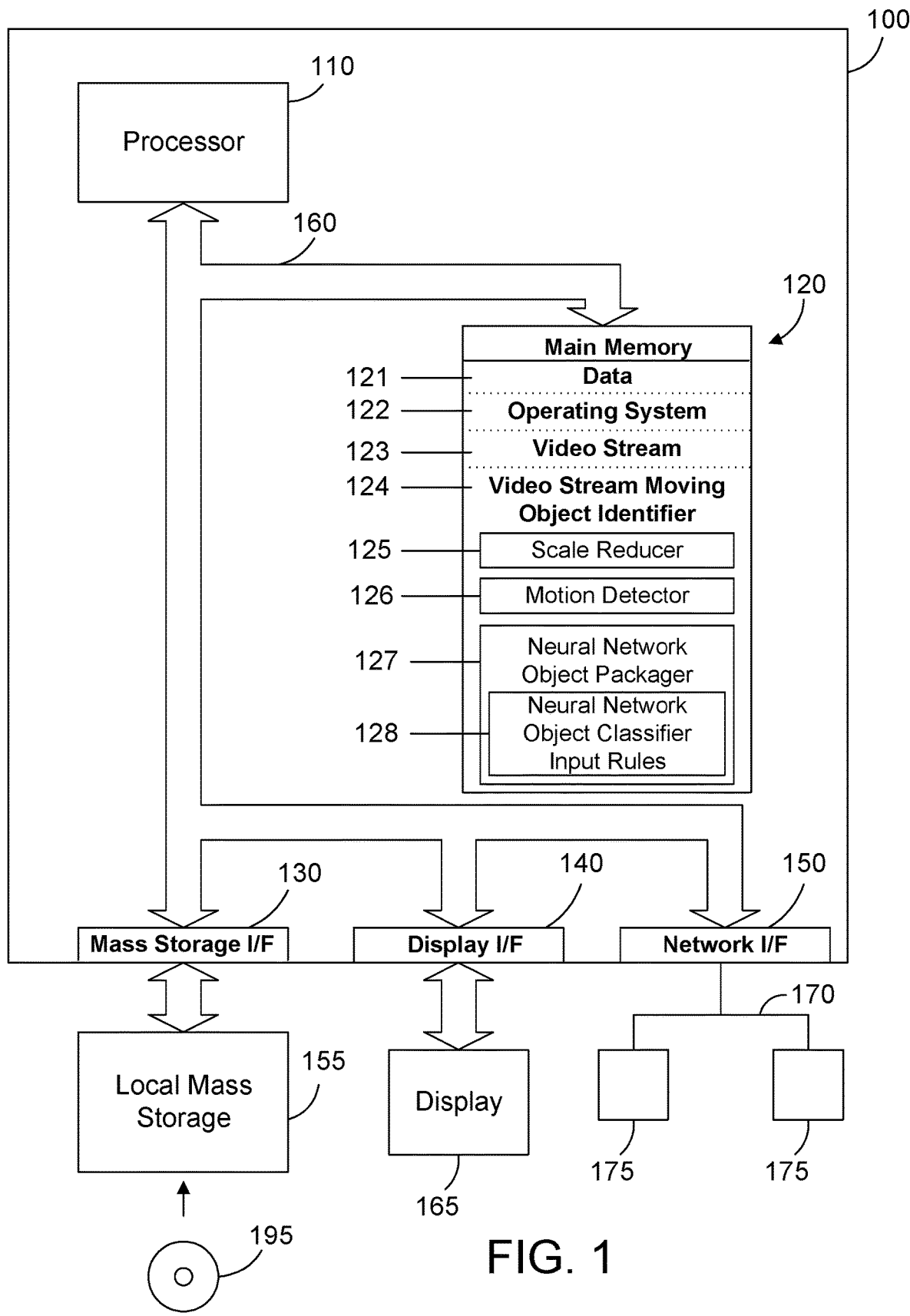
FIG. 1 is a block diagram of a computer system that includes a video stream moving object identifier.

Referring to FIG. 1, a computer system 100 is one suitable implementation of a computer system that includes a video stream moving object identifier as described in more detail below. Computer system 100 is an IBM Power9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such as a flash drive. Still another suitable type of local mass storage device 155 is a hard disk drive or a solid state drive.

Main memory 120 preferably contains data 121, an operating system 122, a video stream 123, and a video stream moving object identifier 124. Data 121 represents any data that serves as input to or output from any program in computer system 100. Operating system 122 may be a multitasking operating system, such as AIX or LINUX, or may be any other suitable operating system. The video stream 123 represents a video stream from a stationary camera, and preferably comprises a series of still-shot frames that collectively make up the video stream 123. The video stream moving object identifier 124 analyzes multiple sequential frames in the video stream 123, and determines moving objects in the multiple sequential frames. The video stream moving object identifier 124 preferably includes a scale reducer 125, a motion detector 126, and a neural network object packager 127 that packages the detected moving objects into a format according to defined neural network object classifier input rules 128. Essentially, the neural network object packager 127 prepares the objects identified as moving objects by the motion detector 126 to be input into a neural network classifier, as described in more detail below.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, video stream 123 and video stream moving object identifier 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the video stream moving object identifier 124.

Although computer system 100 is shown to contain only a single processor and a single system bus, those skilled in the art will appreciate that a video stream moving object identifier as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
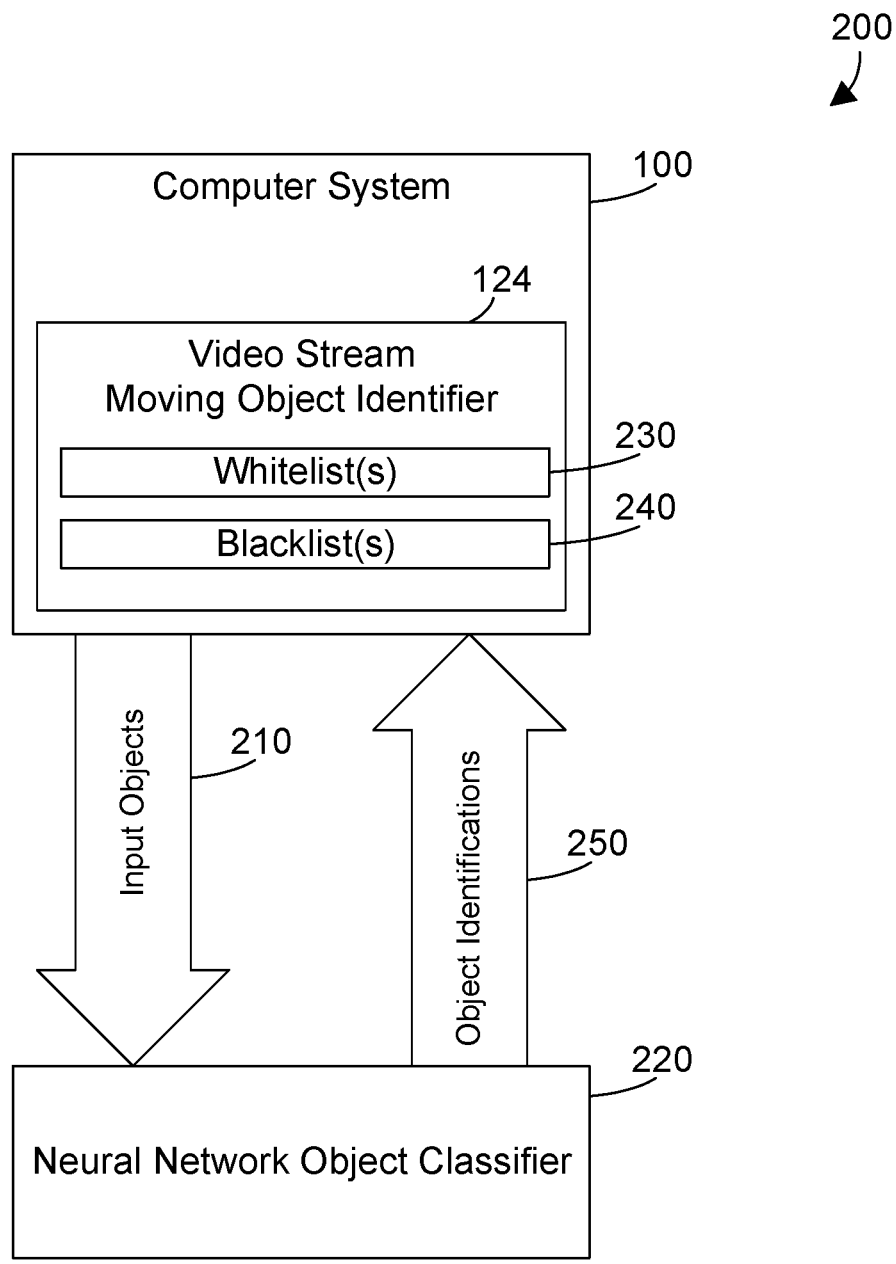
FIG. 2 is a block diagram of a system for identifying moving objects in a video stream.

Referring to FIG. 2, a system 200 for identifying moving objects includes a computer system 100 such as shown in FIG. 1 with a video stream moving object identifier 124. The video stream moving object identifier 124 outputs input objects 210 to a neural network object classifier 220, which can then identify a moving object in one or more of the input objects. The neural network object classifier 220 receives the input objects 210 from the video stream moving object identifier 124, processes the input objects 210, and outputs an object identification 250 for each input object with a corresponding confidence value. The video stream moving object identifier 124 may optionally include one or more whitelists 230 and one or more blacklists 240. A whitelist 230 preferably specifies objects that are moving objects of interest in the video stream. For example, if moving cars are of interest, moving cars can be included in a whitelist 230. A blacklist 240 preferably specifies objects that may be moving but are not of interest in the video stream. For example, trees that have leaves that blow in the wind could be on a blacklist 240 so trees that are moving in a video stream are not identified as moving objects, because they are not of interest. When an object on a whitelist is identified by the neural network object classifier 220 with a high level of confidence, the object is identified by the video stream moving object identifier 124 as an object of interest. When an object on a blacklist is identified by the neural network object classifier 220 with a high level of confidence, the object is not identified by the video stream identifier 124 as an object of interest, because the object's presence on the blacklist indicates the object is not of interest.

Neural network object classifier 220 could be a known classifier that is commercially available, such as GoogLeNet, AlexNet, ResNet, and Nvidia Jetson TX1. GoogLeNet, AlexNet, ResNet are all cloud-based neural network object classifiers, while Nvidia Jetson TX1 is a single-board computer that has a CPU and GPU in a low power package, which can be programmed as a stand-alone hardware-based neural network object classifier. The Nvidia Jetson TX1 can process many image regions of 224×224 pixels in parallel. The ability to identify multiple moving objects in parallel greatly enhances the performance of the system 200. Many input objects 210 could thus be processed in parallel by the neural network object classifier 220. While the neural network object classifier 220 is shown separate from computer system 100 in FIG. 2, the neural network object classifier 220 could be incorporated within the computer system 100 within the scope of the disclosure and claims herein. In addition, while known neural network object classifiers could be used, it is equally within the scope of the disclosure and claims herein to use a neural network object classifier that is not currently known in the art.

Figure 3:
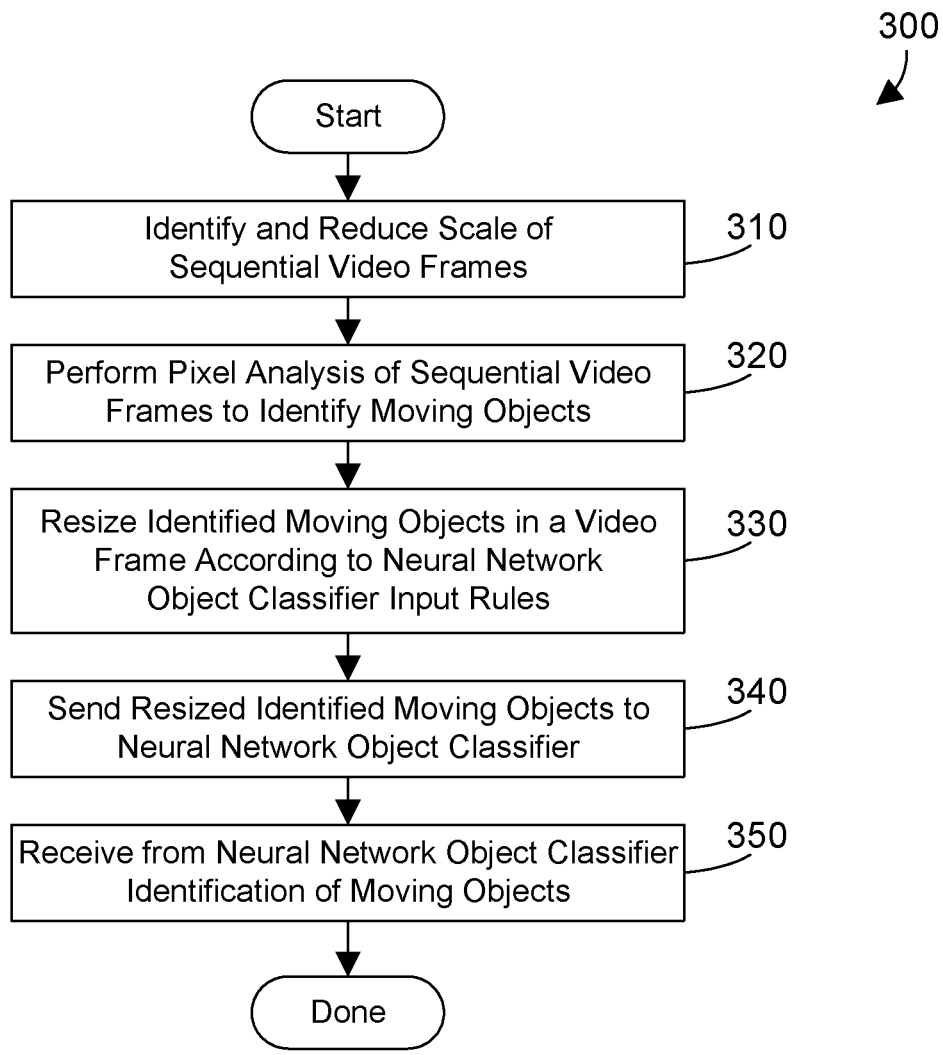
FIG. 3 is a flow diagram of a method for identifying moving objects in a video stream.

Referring to FIG. 3, a method 300 is preferably performed by the video stream moving object identifier 124 shown in FIGS. 1 and 2. Sequential video frames are identified, and their scale is reduced (step 310). The reduction in scale is preferably performed by the scale reducer 125 shown in FIG. 1. Reducing the scale in the video frames can significantly decrease the processing time for identifying moving objects. For example, a video frame of 1920×1080 pixels could be reduced by a factor of ten in each direction, making the resulting frame 192×108. This reduces the computational intensity by 100 times. The scale reduction in step 310 can be any suitable reduction, as needed. For example, the scale reduction can be greater for images that have a relatively narrow field of view and in which moving objects are relatively large. The scale reduction can be less for images that have a wide field of view and in which moving objects are relatively small. The scale reduction in step 310 expressly extends to any suitable reduction of scale of an image, whether slight or significant. In one specific embodiment, the scale is reduced by at least half in step 310.

Figure 4:
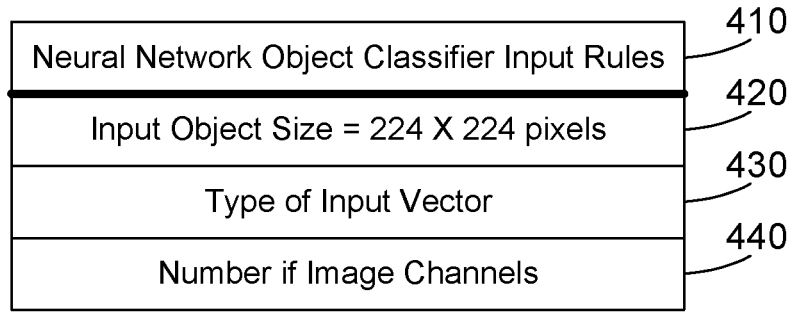
FIG. 4 is a table showing an example input rule for a neural network classifier.

Once the sequential video frames are reduced in scale in step 310, pixel analysis is performed on the sequential video frames to identify moving objects (step 320). The pixel analysis in step 320 is preferably performed by the motion detector 126 in FIG. 1. The pixel analysis in step 320 can include, for example, rolling average pixel difference in two passes, where each pixel in the frame is compared against the rolling average value in N1 previous frames in the first pass and also in N2 previous frames in the second pass, where N2 is much greater than N1. In one specific implementation, N2 is at least an order of magnitude greater than N1. The pixel is labeled "in motion" when both differences exceed a threshold. In other words, there's motion in the short term sense (in N1 frames) but also in the long term sense (in N2 frames). In-motion pixels are marked, and bounding boxes are drawn around the in-motion pixels to identify moving objects. By performing the pixel analysis in two passes based on a different number of frames, both slow and fast-moving objects can be detected. The moving objects are then resized according to neural network classifier input rules (step 330). The resizing in step 330 can be performed, for example, by the neural network object packager 127 shown in FIG. 1. Suitable examples of neural network object classifier rules 410 are shown in FIG. 4 to include a specification of input object size of 224×224 pixels 420; a type of input vector 430, such as 32-bit floating point, 16-bit floating point, or 8-bit integer; and a number of image channels 440, such as three channels for red-green-blue (RGB) images or four channels for cyan, magenta, yellow and key (CMYK) images. Thus, for the rule 420 shown in FIG. 4, the moving objects identified in step 320 are resized to be 224×224 pixels in size. The resized identified moving objects are then sent to a neural network object classifier (step 340). The system then receives from the neural network object classifier an identification of moving objects (step 350). Method 300 is then done.

Figure 5:
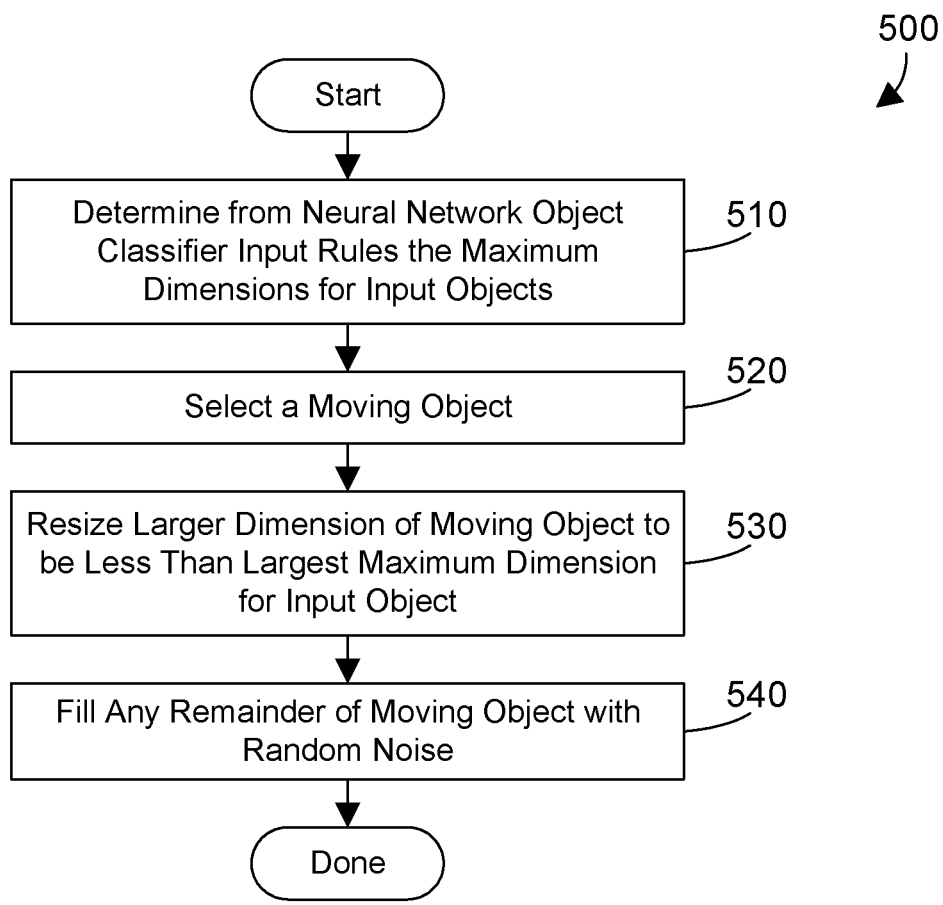
FIG. 5 is a flow diagram of a suitable method for resizing moving objects according to neural network classifier input rules.

Referring to FIG. 5, a method 500 is one suitable implementation for step 330 in FIG. 3 for a single moving object. Determine from the neural network object classifier input rules the maximum dimensions for input objects (step 510). For the specific rule 420 shown in FIG. 4, we assume the maximum dimensions are 224×224 pixels. A moving object is selected (step 520). The larger dimension of the moving object is resized to be the dimension for an input object (step 530). Any remainder of the moving object is filled with random noise (step 540). Method 500 is then done. When method 500 is done, the moving object is now in the appropriate format to be output by the video stream moving object identifier 124 in FIG. 2 as an input object to the neural network object classifier 220.

Figure 6:
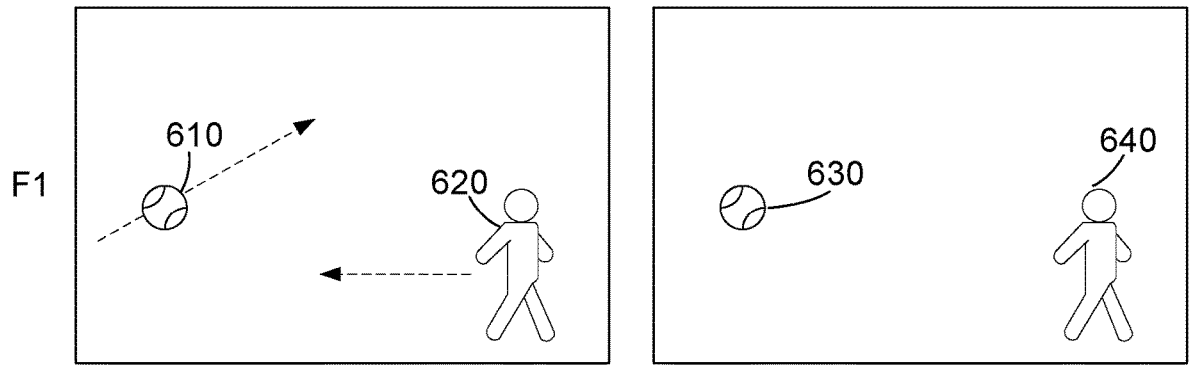
FIG. 6 shows a sample video frame F1 and a corresponding identification of objects using pixel analysis.
Figure 7:
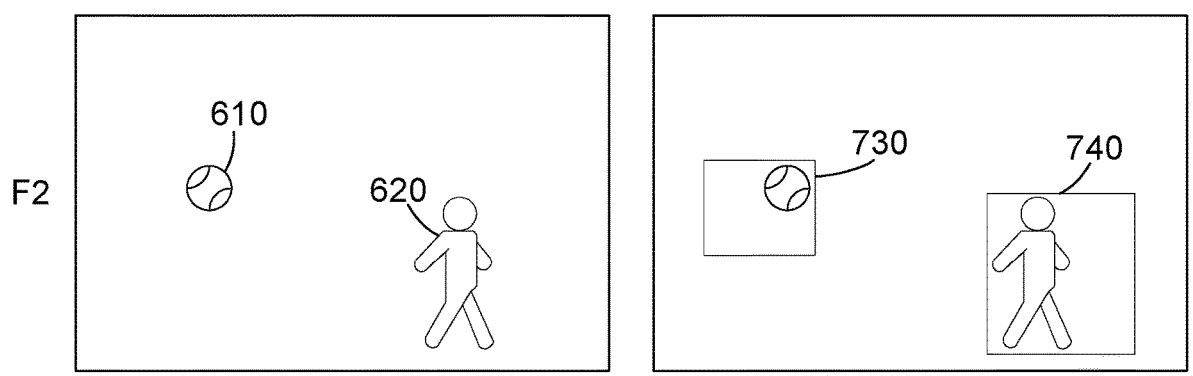
FIG. 7 shows a sample video frame F2 and a corresponding identification of objects using pixel analysis of both frame F1 and F2.
Figure 8:
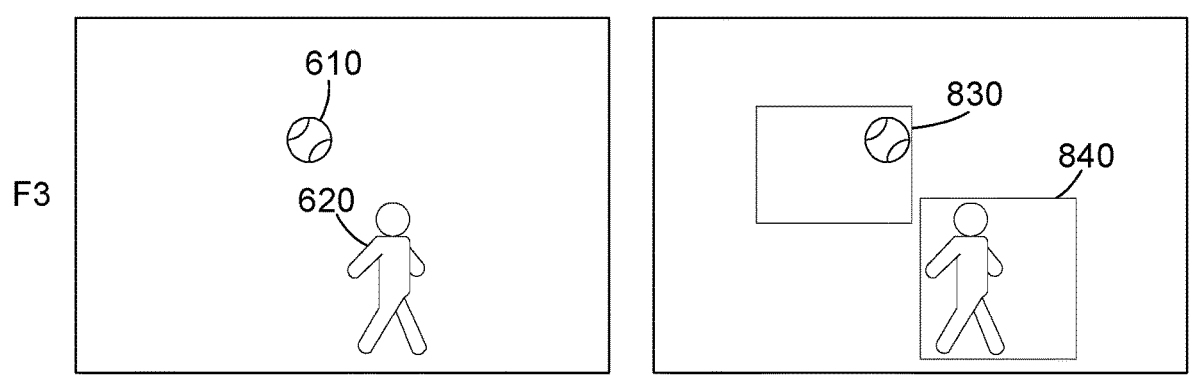
FIG. 8 shows a sample video frame F3 and a corresponding identification of objects using pixel analysis of frames F1, F2 and F3.

A simple example is now given in FIGS. 6-10 to illustrate some of the things discussed generally above. Referring to FIG. 6, we assume a video frame F1 includes a baseball 610 and a person walking 620. For this example we assume the subsequent frames will show the baseball moving up and right along the dotted line as shown, and the person 620 moving left along the dotted line as shown. FIG. 7 shows the next video frame F2 in time. The baseball 610 has moved farther up and right, and the person 620 has moved farther left. The bounding box for the baseball is expanded to include the new position of the baseball, as shown at 730 in FIG. 7. Similarly, the bounding box for the person, as expanded to include the new position of the person, as shown at 740. FIG. 8 shows the next video frame F3. The baseball 610 has moved farther up and right, and the person 620 has moved farther left. The bounding box for the baseball is expanded to include the new position of the baseball, as shown at 830 in FIG. 8. Similarly, the bounding box for the person is expanded to include the new position of the person, as shown at 840.

Figure 9:
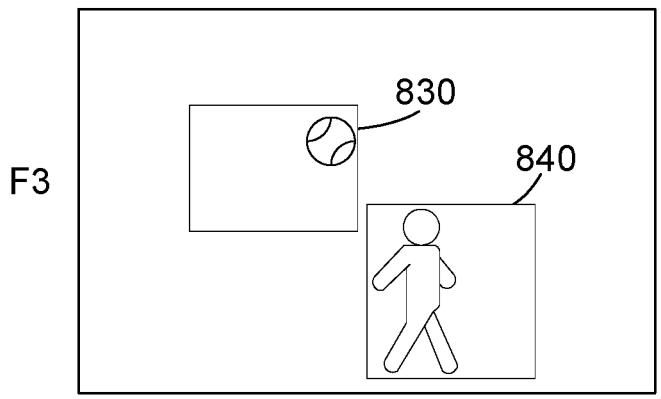
FIG. 9 shows a sample video frame with two objects that have been identified as moving objects.
Figure 10:
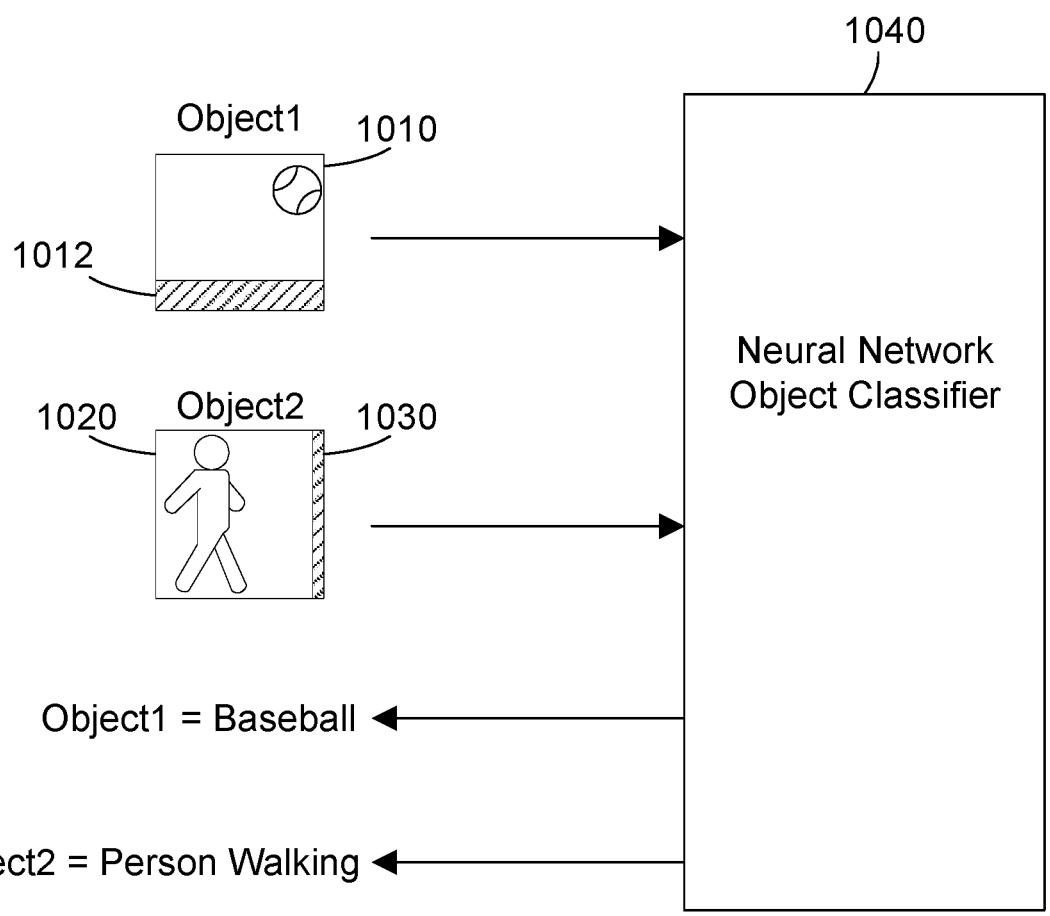
FIG. 10 is a block diagram showing the input of resized objects corresponding to the identified moving objects in FIG. 9 to a neural network object classifier, which identifies the objects as a baseball and a person walking.

The pixel analysis between frames F1, F2 and F3 can identify the baseball and the person as moving objects in frame F3, with bounding boxes around the moving objects as shown at 830 and 840 in FIGS. 8 and 9. These objects are then resized to be within the 244×244 pixel range specified in rule 420 in FIG. 4. We assume the object 830 in FIG. 9 that has the baseball is resized as Object1 1010 in FIG. 10 with a width of 244 pixels. Object1 1010 is resized to be exactly 244×244 pixels by padding the bottom of the object with random noise, shown at 1012 in FIG. 10. Object 840 in FIG. 9 of the person is resized as Object2 1020 in FIG. 10 with a height of 244 pixels. Object 1020 is resized to be exactly 244×244 pixels by padding the right side of the object with random noise, as shown at 1030 in FIG. 10. The result is two objects Object1 and Object2 that are 244×244 pixels each. These two objects are input to the neural network object classifier 1040, which is one suitable example for the neural network object classifier 220 in FIG. 2. We further assume the neural network object classifier 1040 can classify Object1 as a baseball with a high level of confidence, and can classify Object2 as a person walking with a high level of confidence. As a result, the neural network object classifier 1040 returns the results that Object1 is a baseball with a corresponding high level of confidence, and Object2 is a person walking with a high level of confidence, as shown in FIG. 10. Note the specific object identifications in FIG. 10 are specific examples of object identifications 250 shown in FIG. 2. Assuming a baseball and a person walking are both on a whitelist 230 shown in FIG. 2, the video stream moving object identifier 124 will identify these objects as objects of interest.

While the computer system 100 in FIG. 1 has been described herein as a Power9 computer system, the method of identifying moving objects as described herein is suitable to be performed on other, low-power devices. Examples of such low-power devices include tablet computers, mobile phones, a Raspberry Pi, NVIDIA Jetson, etc.

The disclosure and claims herein support an apparatus comprising: at least one processor; a memory coupled to the at least one processor; a video stream residing in the memory, wherein the video stream comprises a plurality of frames; and a video stream moving object identifier that processes the plurality of frames in the video stream by performing pixel analysis of sequential frames to identify a moving object, resizes the moving object according to input rules for a neural network object classifier, sends the resized moving object to the neural network object classifier, and receives from the neural network object classifier an identification of the resized moving object.

The disclosure and claims herein further support a method for identifying moving objects in a video stream comprising a plurality of frames, the method comprising: processing the plurality of frames in the video stream by performing pixel analysis of sequential frames to identify a moving object; resizing the moving object according to input rules for a neural network object classifier; sending the resized moving object to the neural network object classifier; and receiving from the neural network object classifier an identification of the resized moving object.

The disclosure and claims herein additionally support a method for identifying moving objects in a video stream comprising a plurality of frames, the method comprising: reducing scale of a plurality of sequential frames by at least half; processing the plurality of frames in the video stream by performing pixel analysis of sequential frames to identify a moving object using rolling average pixel difference for each pixel in the sequential frames, wherein the rolling average pixel difference for each pixel in the sequential frames is performed in a first pass for a smaller number of frames and in a second pass for a larger number of frames that is at least an order of magnitude larger than the smaller number of frames; resizing the moving object according to input rules for a neural network object classifier, wherein the input rules for the neural network object classifier specify pixel size for objects input to the neural network object classifier, wherein the resizing the moving object comprises: resizing a large dimension of the moving object to be less than a largest maximum dimension for an input object for the neural network classifier; and filling a remainder of the moving object with random noise to make the moving object a desired size for the neural network object classifier; sending the resized moving object to the neural network object classifier; the neural network object classifier processing the resized moving object and a plurality of other input objects in parallel; and receiving from the neural network object classifier an identification of the resized moving object.

A video stream moving object identifier takes a series of video frames as input, reduces the scale of the video frames, then performs pixel analysis on the sequential video frames to identify moving objects. Once moving objects are identified, the moving objects are resized according to input rules for a neural network object classifier to make the resized objects the correct size to be input to the neural network object classifier. The moving objects are then sent to a neural network object classifier, which processes the objects and returns an identification of the moving objects. The neural network object classifier can operate using one or more whitelists and one or more blacklists.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a video stream residing in the memory, wherein the video stream comprises a plurality of frames; and
a video stream moving object identifier that processes the plurality of frames in the video stream by performing pixel analysis of sequential frames to identify a moving object, resizes the moving object according to input rules for a neural network object classifier, sends the resized moving object to the neural network object classifier, and receives from the neural network object classifier an identification of the resized moving object, wherein the resizing of the moving object comprises:
resizing a large dimension of the moving object to be less than a largest maximum dimension for an input object for the neural network classifier, and
filling a remainder of the moving object with random noise to make the moving object a desired size for the neural network object classifier.

2. The apparatus of claim 1 wherein the input rules for the neural network object classifier specify pixel size for objects input to the neural network object classifier.

3. The apparatus of claim 1 wherein the neural network object classifier processes a plurality of input objects in parallel.

4. The apparatus of claim 1 wherein, prior to performing the pixel analysis, the video stream moving object identifier reduces scale of the plurality of sequential frames.

5. The apparatus of claim 4 wherein the video stream moving object identifier reduces scale of the plurality of sequential frames by at least half.

6. The apparatus of claim 1 wherein the pixel analysis of sequential frames comprises a rolling average pixel difference for each pixel in the sequential frames.

7. The apparatus of claim 6 wherein the rolling average pixel difference for each pixel in the sequential frames is performed in a first pass for a smaller number of frames and in a second pass for a larger number of frames that is at least an order of magnitude larger than the smaller number of frames.

8. The apparatus of claim 7 wherein the pixel analysis places a bounding box around each moving object.

9. A method for identifying moving objects in a video stream comprising a plurality of frames, the method comprising:
processing the plurality of frames in the video stream by performing pixel analysis of sequential frames to identify a moving object;
resizing the moving object according to input rules for a neural network object classifier;
sending the resized moving object to the neural network object classifier; and
receiving from the neural network object classifier an identification of the resized moving object,
wherein the resizing the moving object comprises:
resizing a large dimension of the moving object to be less than a largest maximum dimension for an input object for the neural network classifier; and
filling a remainder of the moving object with random noise to make the moving object a desired size for the neural network object classifier.

10. The method of claim 9 wherein the input rules for the neural network object classifier specify pixel size for objects input to the neural network object classifier.

11. The method of claim 9 further comprising the neural network object classifier processing a plurality of input objects in parallel.

12. The method of claim 9 wherein, prior to performing the pixel analysis, reducing scale of the plurality of sequential frames.

13. The method of claim 12 wherein the reducing scale comprises reducing scale of the plurality of sequential frames by at least half.

14. The method of claim 9 wherein the pixel analysis of sequential frames comprises a rolling average pixel difference for each pixel in the sequential frames.

15. The method of claim 14 wherein the rolling average pixel difference for each pixel in the sequential frames is performed in a first pass for a smaller number of frames and in a second pass for a larger number of frames that is at least an order of magnitude larger than the smaller number of frames.

16. The method of claim 9 wherein the pixel analysis places a bounding box around each moving object.

17. A method for identifying moving objects in a video stream comprising a plurality of frames, the method comprising:
   reducing scale of a plurality of sequential frames by at least half;
   processing the plurality of frames in the video stream by performing pixel analysis of sequential frames to identify a moving object using rolling average pixel difference for each pixel in the sequential frames, wherein the rolling average pixel difference for each pixel in the sequential frames is performed in a first pass for a smaller number of frames and in a second pass for a larger number of frames that is at least an order of magnitude larger than the smaller number of frames;
   resizing the moving object according to input rules for a neural network object classifier, wherein the input rules for the neural network object classifier specify pixel size for objects input to the neural network object classifier, wherein the resizing the moving object comprises:
      resizing a large dimension of the moving object to be less than a largest maximum dimension for an input object for the neural network classifier; and
      filling a remainder of the moving object with random noise to make the moving object a desired size for the neural network object classifier;
   sending the resized moving object to the neural network object classifier;
   the neural network object classifier processing the resized moving object and a plurality of other input objects in parallel; and
   receiving from the neural network object classifier an identification of the resized moving object.

* * * * *